Patented Sept. 21, 1926.

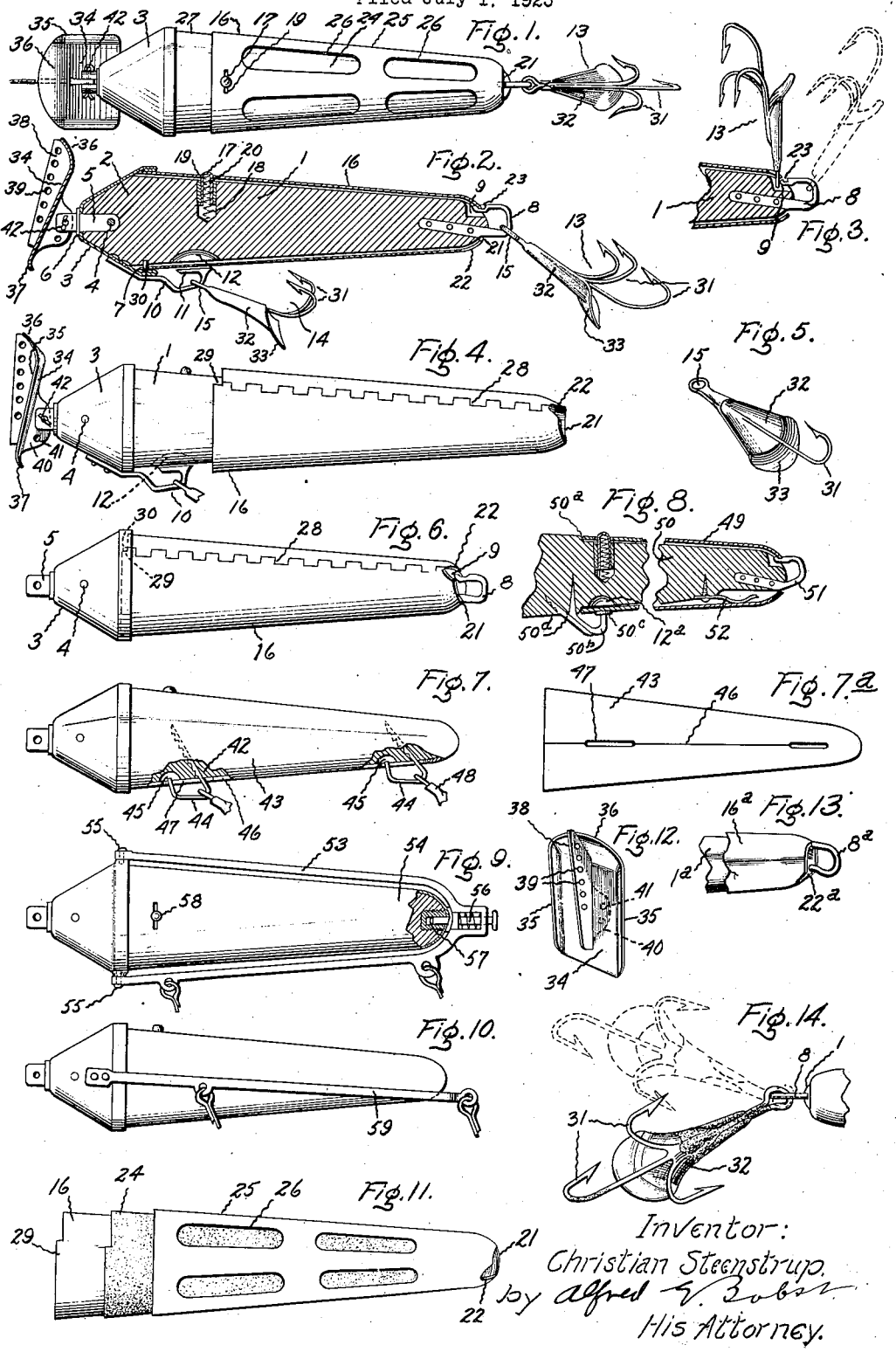
Sept. 21, 1926.
C. STEENSTRUP
ARTIFICIAL FISH BAIT
Filed July 1, 1925
1,600,653
Inventor:
Christian Steenstrup,
by Alfred ...
His Attorney.

1,600,653

UNITED STATES PATENT OFFICE.

CHRISTIAN STEENSTRUP, OF SCHENECTADY, NEW YORK.

ARTIFICIAL FISH BAIT.

Application filed July 1, 1925. Serial No. 40,710.

The present invention relates to artificial fish baits of the type comprising a body to which one or more hooks are attached. Of this type are the baits known as plugs, wabblers, minnows and the like.

Such artificial fish baits now on the market are made up in many different colors and combinations of colors for use under different conditions and for fishing for different kinds of fish. A fisherman, to be well equipped for fishing, finds it necessary to carry a large number of different colored baits. In fact, it is not unusual for a fisherman to carry a number of dozen plugs, for example, all of the same size and differing only in color.

A fishing equipment of this character is not only expensive, but it becomes very bulky and inconvenient to carry, and with a large number of baits packed together it is often difficult to select just the bait wanted at a particular time.

An object of my present invention is to provide an improved artificial fish bait comprising a body member and a number of specially constructed skins or coverings any one of which may be placed on the body member, whereby there may be provided a large number of different colors and combinations of colors of baits.

A further object of my invention is to provide in connection with a fish bait structure of this character an improved form of removable skin or covering which is strong in structure and is capable of being manufactured at a low cost.

Another object of my invention is to provide in connection with a bait of the plug type an improved arrangement whereby the bait may be made to ride at any desired depth beneath the water and whereby it will have imparted to it a continuous up and down movement which serves to increase its attractiveness.

A further object of the invention is, in connection with a plug structure having a removable skin, to provide an improved construction for detachably fastening the fish hooks to the body members of a plug whereby the hooks, or the skin, or both, may be changed easily but, at the same time, when attached to the plug body they are firmly held and locked in place.

And a further object of my invention is to provide an improved form of hook structure which may be made up in different color combinations and which when attached to a plug will ride out straight behind the plug and will take on a sidewise swinging motion simulating the movements of the tail of a fish.

For a consideration of what I believe to be novel and my invention, attention is directed to the accompanying description and the claims appended thereto.

In the drawing, Fig. 1 is a top plan view of a fish bait embodying my invention: Fig. 2 is a vertical sectional view thereof; Fig. 3 is a detail sectional view illustrating the manner in which the hook structure at the end of the plug is removed; Fig. 4 is a view showing the manner in which the detachable skins are removed; Fig. 5 is a perspective view of a hook structure; Fig. 6 is a side view of the bait showing the manner in which the removable skin is turned to unlock the hook structure or structures to permit of their removal; Fig. 7 is a side view partly in section of a modification; Fig. 7a is a view from the underside of the form of skin shown in Fig. 7; Fig. 8 is a detail sectional view of a modified form of skin and hook locking means; Figs. 9 and 10 are views of two modified structures; Fig. 11 shows a number of skins nested together; Fig. 12 is a perspective view of the forward scoop plate; Fig. 13 is a detail view of a modified form of skin-locking means, and Fig. 14 is a view illustrating the operation of the hook structure.

Referring to the drawing, Figs. 1 to 6 inclusive, 1 indicates a tapered body which may be formed of any suitable material such as wood, for example. It is pointed at its forward end as is indicated at 2. Fitted over pointed end 2 is a cap 3 fastened in place by a pin 4. Pin 4 serves also to hold in position a post 5 having a flange 6 which engages the edge of the opening in cap 3 through which post 5 passes and assists in attaching the cap to body 1. The inner end of cap 3 stands in spaced relation to the tapered body at its point of greatest diameter to provide an annular groove or pocket 7 surrounding body 1. Fastened to body 1 at its rear end is an attaching hook 8 the free end of which lies in spaced relation to the walls of a recess 9 formed in body 1 at its upper side.

Fastened to the underside of body 1 adjacent its forward end is an attaching hook 10, the free end 11 of which extends parallel to the underside of body 1 and lies quite close to it. In body 1 directly adjacent to the free end 11 is a recess 12. Fastened to attaching hooks 8 and 10 are fish hook structures 13 and 14, the same having eyes 15 which engage the attaching hooks.

Mounted on body 1 is a removable skin structure or covering 16, the forward end of which is located in annular groove or pocket 7. It is held in position on the body by a suitable spring pressed locking button 17 located in a recess 18 in body 1 and engaging in a hole 19 in skin structure 16. The spring for the locking button is indicated at 20. At its rear end, skin structure 16 is provided with a hole or opening 21 having a notch 22 in its edge at one point. Notch 22 is of a size such that when it stands in line with the top of attaching hook 8, the attaching hook will pass through the hole. The edge of hole 21 is adapted to cooperate with the free end of attaching hook 8 serving to cover recess 9 and to close the opening into the hook so that fish hook structure 13 cannot become detached when the skin is locked in position by button 17. In other words, the skin structure 16 serves to lock fish hook structure 13 onto body 1. In the arrangement shown in Figs. 1 to 6, the edge of hole 21 engages a notch 23 in the free end of attaching hook 8. However, any other suitable arrangement may be used. For example, I may use the arrangement shown in Fig. 13 wherein the end of the skin structure 16ª simply abuts against the free end of the attaching hook 8ª, or lies so close to it that the hook structure cannot come off. In Fig. 13, 22ª indicates the notch in the skin structure corresponding to notch 22 in Figs. 1 to 6, and 1ª indicates the body of the plug. Also, when the skin structure is in position on body 1, it covers recess 12 and thus serves to prevent fish hook structure 14 from coming off attaching hook 10.

The skin structure may comprise a single skin member or it may comprise a plurality of skin members telescoped one within the other, the skin members being of different colors so as to give different color combinations. For example, I may utilize two skin members, an inner member and an outer member, the latter being provided with openings through which the inner member appears. And the outer member may be shorter than the inner member whereby a portion of the inner member will appear as a circular band. An arrangement of this character is illustrated in Fig. 1 wherein 24 indicates an inner skin member and 25 an outer skin member, the latter being provided with openings 26 through which skin member 24 shows, and being shorter than skin member 24 so that the forward end of skin member 24 appears as a band 27. By this arrangement, it will be seen that by providing a comparatively small number of inner and outer skin members of different colors, a large number of color combinations may be made. In Fig. 2 of the drawing, only one skin member is shown on the body.

The skin members may be made from any suitable material and formed in any suitable manner. I have found celluloid to be a suitable material. I may make the skins from flat stock of suitable colors, blanks being first stamped out and finally rolled to bring their edges into engagement, the edges being then fastened together by a suitable adhesive. In have found an arrangement as illustrated particularly in Figs. 4 and 6, wherein the seam 28 between the edges is in the form of interlocking tongues, to be satisfactory. Such an arrangement gives a strong joint and is easily made.

When the parts are in the positions shown in Fig. 2, the skin 16 is fastened by locking button 17 on body 1 and fish hook structures 13 and 14 are locked on attaching hooks 8 and 10 by the skin. The forward end of the skin is held in annular groove 7. If now it is desired to change the skin 16 or to remove either or both of the fish hook structures 13 and 14, first the locking button 17 is depressed and the skin turned on the body to bring notch 22 in line with the top of attaching hook 8 and recess 9, button 17 being held depressed by the skin. This uncovers recess 9 (see Figs. 3 and 6) and permits fish hook structure 13 to be moved after the manner illustrated in Fig. 3, eye 15 sliding off through recess 9. After fish hook structure 13 has been removed, skin 16 can be slipped off body 1 by moving it longitudinally therefrom. The removal of skin 16 uncovers recess 12 so that if desired fish hook structure 14 may be removed. In this connection, it will be clear from Fig. 2 that when a skin 16 is in position on the plug body, end 11 of attaching hook 10 stands so close to the body that fish hook structure 14 cannot be removed. When the skin is removed, however, uncovering recess 12 then the fish hook structure can be removed, the eye 15 passing through recess 12.

In assembling, the parts are replaced in the reverse order. First, a fish hook structure is placed on attaching hook 10. Next, a skin is slipped onto body 1, it being put on with notch 22 in line with the top of attaching hook 8. Then a fish hook structure is put onto attaching hook 8. And finally, skin 16 is turned to bring notch 22 out of line with the top of attaching hook 8 and away from recess 9 in body 11 and also to bring hole 19 to a position wherein locking button 17 may spring into it. In this connection, it will be noted that locking button 17 is out of line with notch 22, being displaced therefrom by 180 degrees. This means that in removing or replacing a skin on the body, the skin must be turned through an angle of 180 degrees. I may, if desired, provide a stop means for limiting the turning movements of a skin on body 1 and to this end, the forward ends of the skin may be provided with shoulders 29 which engage a pin 30, projecting from body 1, the pin 30 being located in annular groove 7. (See Fig. 6.)

In connection with attaching hook 10, it will be noted that it is fastened to body 1 in advance of the forward end of skin 16, it being in the present instance fastened to cap 3, and that it projects rearwardly in spaced parallel relation to body 1, to the desired location for a fish hook structure. With this arrangement, the supporting hook is not in the way of the skin and hence does not require that the skin be split in line with it in order that the skin may be changed easily. A skin which is not split has certain advantages over one which is split in that it is stronger and is less likely to be damaged when being carried or when nested with other skins.

With the foregoing arrangement, it will be seen that the skin can be quickly and easily changed, and also, when desired, that one or both of the fish hook structures may be changed.

Each fish hook structure comprises one or a plurality of hooks 31 attached to a plate 32 in the forward end of which is located the eye 15. Plate 32 is curved upwardly and increases in width from its forward end to its rear end, being somewhat triangular in shape. At its rear end it is curved downwardly and inwardly as is indicated at 33 to form a sort of shallow scoop in which the water may catch. This scoop performs an important function in that it causes the fish hook structure to weave sidewise back and forth when the plug is pulled through the water. Eye 15 is made quite large as compared with the eyes usually met with in this class of apparatus, and in addition attaching hooks 8 and 10 are made large so as to provide a connection between the fish hook structure and the plug which is quite loose thus giving freedom for movement of the fish hook structure relatively to the plug body. When the plug is being pulled through the water, the plate 32 rides flat on the water with the fish hooks pointing upward, and I have found that with this arrangement the fish hook structure will weave sidewise back and forth after the manner illustrated in Fig. 14, the structure moving back and forth from the full line position to the dotted line position. This action I now believe is caused as follows:—if the fish hook structure is straight with the plug body and riding flat in the water, some unevenness of the action of the water on the scoop will throw the fish hook structure sidewise and it will continue to move sidewise until such time as the eye catches on the edge of the attaching hook. This will arrest further direct sidewise movement but will impart a turning movement to the fish hook structure until the eye 15 binds against the attaching hook, the turning being on the longitudinal axis of the structure. When this turning takes place, the water will escape from the upper edge of the scoop and there will be caused a force which will start the fish hook structure moving in the other direction. The movement being started, will not cease again until the structure has swung to the extreme opposite position. This back and forth swinging movement will continue thus, giving to the structure the appearance of the movements of the tail of a fish. Also the fish hook structure attached under the plug will weave back and forth in a similar manner.

This fish hook structure is not claimed herein as it forms the subject matter of my divisional application Serial Number 123,648, filed July 20, 1926.

In carrying out my invention, I may color the plate 32 in any desired manner and I may provide a number of fish hook structures each having differently colored plates. By this means I can provide a fish hook structure of a coloration to go well with the particular skin 16 being used.

In connection with the plug, I provide at its forward end a specially constructed scoop shaped plate which may be adjusted to make the plug travel at different depths beneath the water and which serves to impart to the plug an up and down movement when the plug is drawn through the water. The scoop comprises a plate 34 having forwardly curved side edges 35 and a forwardly curved top edge 36. The bottom edge may be curved back slightly as is indicated at 37. The structure of this scoop is particularly illustrated in the perspective view in Fig. 12. Extending vertically of the scoop on its front face and toward its top is a fin 38 provided with a series of holes 39 in which a fish line may be attached. On the back of the scoop is an ear 40 provided with one or more vertically-spaced holes 41 by means of which the scoop is pivoted to the outer end of post 5. Post 5 is slotted and the ear fits into the slot and may be attached thereto by a cotter pin as is indicated at 42, the scoop being pivotally connected to the post. Ear 40 is well toward the bottom of the scoop so that the scoop is pivoted to the plug at a point somewhat below the center of the scoop.

The depth at which the plug will ride in the water will depend on the angle which the scoop shaped plate makes with the body of the plug, and this in turn will depend upon the hole 39 in which the fish line is fastened. When the line is fastened in the uppermost hole the top of the scoop will tilt forward and the plug will run near the top of the water. On the other hand, when the line is fastened in the lowermost hole, the top of the scoop will be tilted backward and the plug will ride deep in the water. When the line is fastened in intermediate holes, the plug will ride in the water at intermediate depths. The scoop is free to tilt on its pivot, and as the plug is pulled through the water, owing to variations in the pull on the line which always are present, the scoop will be turned or tilted up and down to a limited extent, thereby causing the plug to take on an up and down movement. As the scoop tilts back, the water leaves it more easily, and this relieves somewhat the force of the water on it. As a result it will then come forward to again catch the water. This effect also serves to give the plug an up and down motion. In actual use, I have found this action to take place to a marked degree. I consider the arrangement of this scoop plate pivoted to the body of the plug after the manner described as being an important feature of my invention. In this connection, it will be understood that it is the pivoting of the scoop plate to the body of the plug in such manner that the plate may turn in a vertical plane that enables the action described to take place. Also, I have found that a scoop shaped plate of this character serves to impart to the plug a sidewise movement, this being due to the action of the water on the scoop.

In Figs. 7 and 7ª I have illustrated a modification of my invention wherein the removable skin is used to lock the fish hook structures on the plug and wherein they cannot be removed until the skin is removed. In these figures, 42 indicates the body of the plug and 43 the removable skin. Fastened to body 42 are two supporting hooks 44, the free ends of which point toward the body and terminate directly adjacent to shallow recesses 45 in the body. The skin is split longitudinally in line with supporting hooks 44 as is indicated at 46 and at the points where supporting hooks 44 are located, I provide rectangular openings 47 through which the attaching hooks project when the skin is in place on the body. When the skin is in position on the body 42, it covers recesses 45 and prevents the fish hook structures which are indicated at 48, from being detached. In other words, it locks the fish hook structures on the plug. When the skin is removed, the fish hook structures may be detached in a manner which is obvious from the drawing. Otherwise, the construction of Figs. 7 and 7ª may be similar to that of Figs. 1 to 6.

In Fig. 8 is shown a modification wherein the removable skin 49, instead of being turned on the plug body 50 to release it from engagement with attaching hook 51, is pressed upward to accomplish this result. The skin is pressed downward by a spring 52 to hold the skin in the notch in the free end of attaching hook 51. To release it, it is pushed upward against the action of spring 52.

In Fig. 9 is shown a modified form of fish hook attaching means which permits of the ready removal of a detachable skin without interference from the fish hooks and without requiring the use of a split skin. In this modification, the fish hooks are carried by a fish hook supporting member in the form of a U-shaped frame 53 which is pivoted to the head of the plug body in advance of the forward end of the removable skin 54. The pivots are in the form of suitable pins 55. The frame extends around the end of the body and is fastened to it at its free end by a spring pressed pin 56 which fits into a socket 57 in the rear end of the plug. The skin 54 is fastened on the plug body by a button 58 similar to the button 17 of Figs. 1 to 6. With this arrangement, when it is desired to remove a skin, pin 56 is pulled back out of socket 57 and the frame is then swung to one side. The skin can be then changed after which the frame is returned to its normal position. The modification in Fig. 10 is similar to that of Fig. 9 except that the U-shaped frame 59 which carries the fish hook structure is rigidly attached to the head of the plug body and extends at an angle to it such that it does not interfere with the removal of the skins. In each of these modifications, the attaching member for the fish hooks is similar to the fish hook attaching member 10 of Figs. 1 to 6 in that it is attached to the head of the plug in advance of the forward end of the removable skin and extends back along the side of the body to bring the fish hooks to the desired location.

Fig. 11 illustrates the way in which a number of differently colored skins may be nested for carrying. As will be noted, the skins nest well one within another so that even a considerable number do not form a bulky bundle. In fact, a large number may be easily carried in the pocket of a coat.

In the use of my invention, a fisherman provides himself with one or two plug bodies, an assortment of differently colored skins or coverings, and a number of fish hook structures having differently colored scoop-shaped plates. He can then by changing the coverings and the hook structures produce a large number of differently colored baits.

In the construction shown in Fig. 8, the plug body is provided with a shoulder 50ª against which the forward end of skin 49 abuts. I have found this arrangement to be satisfactory, especially on small plugs and where the skin itself is not split. The surfaces of the head and skin blend into each other smoothly as shown. Also in this arrangement I have shown an attaching hook 50ᵇ of somewhat different form, the same being finished with a round head 50ᶜ and being braced with an angularly extending member 50ᵈ, the member and attaching hook being soldered together.

In connection with the fish hook structure 13, I may in a construction as shown in Fig. 2, for example, omit the hook or hooks from the plate 32, the plate alone being provided. In this case, the plate simulates the action of the tail of a fish. I then depend upon the hook structure 14 for hooking a fish.

In accordance with the provisions of the patent statutes, I have described the principle of operation or my invention, together with the apparatus which I now consider to represent the best embodiment thereof, but I desire to have it uderstood that the apparatus shown is only illustrative and that the invention may be carried out by other means.

What I claim as new and desire to secure by Letters Patent of the United States is:—

1. In an artificial fish bait, the combination of a body member, an attaching hook thereon adapted to carry a fish hook structure, and a removable covering for the body member which when in place on the body member closes the opening of the attaching hook to lock the hook structure in position.

2. In an artificial fish bait, the combination of a body member, an attaching hook thereon adapted to carry a fish hook structure, said body member having a recess adjacent to the free end of said attaching hook, and a removable covering for the body member which, when in position on the body member, covers said recess to lock the hook structure in position.

3. In an artificial fish bait, the combination of a body member, an attaching hook at the rear end of the body member, said body member having a recess adjacent to the free end of said attaching hook, and a removable skin which when positioned on the body member covers said recess to obstruct the opening into the attaching hook whereby it serves to lock a fish hook structure in place on the hook.

4. In an artificial fish bait, the combination of a body member, an attaching hook at the rear end of the body member, said body member having a recess adjacent to the free end of said attaching hook, a removable skin having an opening in its end whereby it may be slipped onto said body member over said attaching hook, a notch at the edge of the opening which notch may be made to coincide with said recess, said skin being adapted to be turned on said body member to move the notch away from said recess.

5. The combination with a plug body and a fish hook structure detachably mounted thereon, of a removable skin for the body which when in position thereon locks the fish hook structure on the body.

6. The combination with a plug body and a skin removably mounted thereon, of a supporting member attached to the plug body in advance of the front end of said skin and projecting rearwardly in spaced relation to said plug body, and a fish hook structure carried by said supporting member.

7. The combination with a plug body of a scoop shaped plate pivoted to the body between its ends with the scoop facing forwardly, said plate being freely movable on its pivot and means whereby a fish line may be attached to said plate.

8. The combination with a plug body of a scoop shaped plate pivoted to the front of the body between its ends with the scoop facing forwardly, said plate being freely movable on its pivot and means providing an eye on the front of the plate to which a line may be attached.

9. The combination with a plug body of a scoop shaped plate pivoted to the body with the scoop facing forwardly, said plate being pivoted to the body between its ends at one side of the center of the plate and being freely movable on its pivot, and means providing an eye on the other side of the center of the plate to which a line may be attached.

10. The combination with a plug body of a scoop shaped plate pivoted between its ends to the front end of the body with the scoop facing forwardly, said plate being pivoted to the body at a point below the center of the plate and being freely movable on its pivot, and means providing a plurality of vertically-spaced eyes on the front side of the plate to which a fish line may be attached, said eyes being located above the point of connection between the plate and the body.

11. The combination with a plug body, of a plate pivotally mounted on the body at a point intermediate between the upper and lower edges of the plate and on a substantially horizontal axis, said plate being freely movable on its mounting, and means whereby a fish line may be attached to the plate out of line with the pivot.

12. The combination with a plug body, of a scoop-shaped plate pivotally mounted on the body at a point intermediate between the upper and lower edges of the plate and on a substantially horizontal axis, said plate being freely movable on its mounting and having the deep portion of the scoop at the top, and means whereby a fish line may be attached to the plate intermediate its upper and lower edges.

13. A skin structure for use with a plug body, said skin structure comprising telescoping skins, the outer skin having spaced openings through which the inner skin is visible.

14. The combination with a plug body having a hook-attaching means permanently fastened to its rear end, of a skin structure comprising a continuous walled tubular member adapted to be slipped onto the body, said member having an opening at its rear end of a size such that the hook-attaching means will pass through it, whereby the tubular member may be positioned on the body and passed beyond the hook-attaching means without removing the hook-attaching means.

15. The combination with a plug body having a hook-attaching means permanently fastened to its rear end, of a skin structure comprising a continuous walled tubular member adapted to be slipped onto the body, said member having an opening at its rear end of a size such that the hook-attaching means will pass through it, whereby the tubular member may be positioned on the body and passed beyond the hook-attaching means without removing the hook-attaching means, and means whereby a hook structure may be attached to said hook-attaching means after the skin structure is positioned on the body.

16. The combination with a plug body having at its rear end a permanently attached open eye-hook, of a tubular skin structure adapted to be slipped onto the body from the rear, said structure having an opening at its rear end such that the eye hook may pass through it, and means whereby when the skin structure is in one position on the body, it serves to obstruct the opening of the eye hook, and when in another position it permits access to the opening in the eye hook.

17. The combination with a plug body having an open eye hook permanently attached to it at its rear end and a second open eye hook permanently attached to it at its forward end and projecting rearwardly in spaced relation to the body, of a readily removable skin structure which when in position on the body serves to obstruct the entrances to said open eye hooks whereby it is adapted to lock hook structures on said eye hooks.

18. The combination with a plug body, of a skin structure adapted to be slipped onto the body from one end, means for holding the skin structure on the body, and a hook-supporting structure attached to the body and extending along the body in spaced relation thereto whereby the skin structure may be placed on and removed from the body without interference from said hook-supporting structure.

19. The combination with a plug body having an open eye hook permanently attached to it, the opening to the eye hook facing toward the plug body, of a readily removable skin structure adapted to be placed on the body, said structure when positioned on the body obstructing the opening into the eye hook whereby it serves to lock in position a hook structure on the hook.

20. A skin structure for use with a plug body having an attaching hook at its rear end, said skin structure comprising a tubular member having an opening at its rear end of a size for the attaching hook to pass through, said skin structure being movable relatively to the plug after it is in place thereon to obstruct access to said attaching hook.

In witness whereof, I have hereunto set my hand this 29th day of June, 1925.

CHRISTIAN STEENSTRUP.